US012724258B2

(12) United States Patent
Liu et al.

(10) Patent No.: US 12,724,258 B2
(45) Date of Patent: Sep. 1, 2026

(54) OPTICAL DEVICE AND PRISM MODULE THEREOF

(71) Applicants: Sintai Optical (Shenzhen) Co., Ltd., ShenZhen City (CN); Asia Optical Co., Inc., Taichung (TW)

(72) Inventors: Hua-Tang Liu, Taichung (TW); Sheng Luo, ShenZhen City (CN); Jun-Wei Che, ShenZhen City (CN); Bin Liu, ShenZhen City (CN)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 516 days.

(21) Appl. No.: 18/341,873

(22) Filed: Jun. 27, 2023

(65) Prior Publication Data

US 2024/0019680 A1 Jan. 18, 2024

(30) Foreign Application Priority Data

Jul. 14, 2022 (CN) ........................ 202210824177.8

(51) Int. Cl.
*G02B 23/06* (2006.01)
*G02B 5/04* (2006.01)

(52) U.S. Cl.
CPC ............... *G02B 23/06* (2013.01); *G02B 5/04* (2013.01)

(58) Field of Classification Search
CPC .......... G02B 23/06; G02B 5/04; G02B 5/045; G02B 7/1805; G01C 3/02
USPC .......................................................... 359/407
See application file for complete search history.

(56) References Cited

U.S. PATENT DOCUMENTS

| | | | | |
|---|---|---|---|---|
| 6,512,635 | B1 * | 1/2003 | Takeyama | G02B 27/0172 359/638 |
| 9,097,892 | B2 * | 8/2015 | Bach | G02B 5/04 |
| 10,288,735 | B1 | 5/2019 | Wang et al. | |
| 10,704,903 | B2 * | 7/2020 | Chen | G02B 23/10 |
| 2009/0174939 | A1 * | 7/2009 | Heintz | F41G 3/02 359/480 |
| 2017/0343822 | A1 * | 11/2017 | Border | G02B 5/3083 |
| 2020/0341261 | A1 | 10/2020 | Qan et al. | |

(Continued)

FOREIGN PATENT DOCUMENTS

| | | | |
|---|---|---|---|
| CN | 113534313 | A | 10/2021 |
| CN | 114730025 | A | 7/2022 |

OTHER PUBLICATIONS

A Laser Rangefinder And The Prism And The Light Transmitter Module; Chen et al. CN 108572357, (Year: 2018).*

(Continued)

*Primary Examiner* — Bumsuk Won
*Assistant Examiner* — Rahman Abdur
(74) *Attorney, Agent, or Firm* — McClure, Qualey & Rodack, LLP

(57) ABSTRACT

An optical device and the prism module thereof are provided. The prism module includes a first prism, a second prism, a film and a light guide unit. The film is disposed between the first prism and the second prism. First visible light enters the first prism, passes through the film, enters the second prism, exits from the second prism, reaches the light guide unit, and is reflected to user's eyes by the light guide unit. Also, second visible light passes through the light guide and reaches user's eyes.

20 Claims, 4 Drawing Sheets

(56) References Cited

U.S. PATENT DOCUMENTS

| | | | | |
|---|---|---|---|---|
| 2021/0325178 | A1 | 10/2021 | Liu et al. | |
| 2022/0236579 | A1* | 7/2022 | Kamakura | G02B 27/0176 |

OTHER PUBLICATIONS

Liu, Yun-Kun; (CN 110286483) A Distance Binocular Telescope Optical System (Year: 2018).*

* cited by examiner

OPTICAL DEVICE AND PRISM MODULE THEREOF

BACKGROUND OF THE INVENTION

Field of the Invention

The invention relates to an optical device and the prism module thereof.

Description of the Related Art

Currently, a prism assembly used in a rangefinder is a Schmidt-Pechan prism. In order to arrange the emitting/receiving system and the displaying system well in the rangefinder, providing an additional prism assembly to split light is required. However, such a rangefinder has increased width and height. Further, if the Schmidt-Pechan prism is off-axis in arrangement, then the volume of the prism assembly will be large and the producing cost will be increased. Therefore, a design of new structure is required to address the issue.

BRIEF SUMMARY OF THE INVENTION

An object of the invention is to provide an optical device and the prism module thereof. The optical device has a compact structure. Due to the reduced volume, the displaying system of the optical device has a shorted light path and promoted brightness.

The prism module in accordance with an exemplary embodiment of the invention includes a first prism, a second prism, a film and a light guide unit. The first prism includes a first surface, a second surface and a third surface wherein the second surface adjoins the first surface, and the third surface adjoins the second surface and is disposed opposite to the first surface. The second prism includes a fourth surface, a fifth surface and a sixth surface wherein the fourth surface is disposed towards the first prism, the sixth surface adjoins the fourth surface, and the fifth surface adjoins the fourth surface and is disposed opposite to the sixth surface. The film is disposed between the third surface and the fourth surface. The light guide unit includes a seventh surface and an eighth surface. First visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit. Second visible light enters the light guide unit through the eighth surface and exits from the light guide unit through the seventh surface.

In another exemplary embodiment, invisible light enters the first prism through the first surface, is reflected on the third surface and then on the second surface, and exits from the first prism through the first surface, and a travel direction in which the invisible light enters the first prism and that in which the invisible light exits from the first prism are in parallel.

In yet another exemplary embodiment, the film allows the first visible light to pass through but reflects the invisible light.

In another exemplary embodiment, invisible light is reflected to the prism module by a target object, enters the first prism through the first surface, is reflected on the second surface and then on the third surface, and exits from the first prism through the first surface.

In yet another exemplary embodiment, the film allows the first visible light to pass through but reflects the invisible light.

The optical device in accordance with an exemplary embodiment of the invention includes the above-mentioned prism module and a display. The display generates the second visible light. The first visible light reflected on the seventh surface of the light guide unit overlaps the second visible light exiting from the seventh surface of the light guide unit.

In an exemplary embodiment, a prism module includes a first prism, a second prism and a film. The first prism includes a first surface, a second surface and a third surface wherein the second surface adjoins the first surface, and the third surface adjoins the second surface and is disposed opposite to the first surface. The second prism includes a fourth surface, wherein the fourth surface is disposed towards the third surface of the first prism. The film is disposed between the third surface and the fourth surface. Invisible light enters the first prism through the first surface, is reflected on the third surface and then on the second surface, and exits from the second prism through the first surface. The invisible light is reflected back to the first prism by the film.

In another exemplary embodiment, an optical device includes the above-mentioned prism module, a light emitter and a light receiver. The light emitter generates the invisible light that enters the first prism. The light receiver receives the invisible light that exits from the first prism through the first surface and is reflected back to the optical device by a target object.

In yet another exemplary embodiment, a travel direction in which the invisible light enters the first prism and another travel direction in which the invisible light exits from the first prism are in parallel.

In another exemplary embodiment, the second prism further includes a fifth surface and a sixth surface. The prism module further includes a light guide unit. The light guide unit includes a seventh surface. First visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit.

In yet another exemplary embodiment, the film allows the first visible light to pass through but reflects the invisible light.

In another exemplary embodiment, the second prism further includes a fifth surface and a sixth surface. The prism module further includes a light guide unit. The light guide unit includes a seventh surface and an eighth surface. Second visible light enters the light guide unit through the eighth surface and exits from the light guide unit through the seventh surface.

In yet another exemplary embodiment, a display generates the second visible light.

In another exemplary embodiment, a prism module includes a first prism, a second prism and a film. The first prism includes a first surface, a second surface and a third surface wherein the second surface adjoins the first surface, and the third surface adjoins the second surface and is disposed opposite to the first surface. The second prism includes a fourth surface, wherein the fourth surface is disposed towards the third surface of the first prism. The film is disposed between the third surface and the fourth surface. Invisible light is reflected to the prism module by a target object, enters the first prism through the first surface, is reflected on the second surface and then on the third surface, and exits from the first prism through the first surface. The invisible light is reflected back to the first prism by the film.

In yet another exemplary embodiment, the second prism further includes a fifth surface and a sixth surface. The prism module further includes a light guide unit. The light guide unit includes a seventh surface. First visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit.

In another exemplary embodiment, the film allows the first visible light to pass through but reflects the invisible light.

In yet another exemplary embodiment, the second prism further includes a fifth surface and a sixth surface. The prism module further includes a light guide unit. The light guide unit includes a seventh surface and an eighth surface. Second visible light enters the light guide unit through the eighth surface and exits from the light guide unit through the seventh surface.

In another exemplary embodiment, a display generating the second visible light.

In yet another exemplary embodiment, an optical device includes the above-mentioned prism module, a light emitter and a light receiver. The light emitter generates the invisible light that travels to the target object. The light receiver receives the invisible light that exits from the first prism through the first surface.

In another exemplary embodiment, a travel direction in which the invisible light travels to the first prism and another travel direction in which the invisible light exits from the first prism are in parallel.

DETAILED DESCRIPTION OF THE INVENTION

Figure 1:
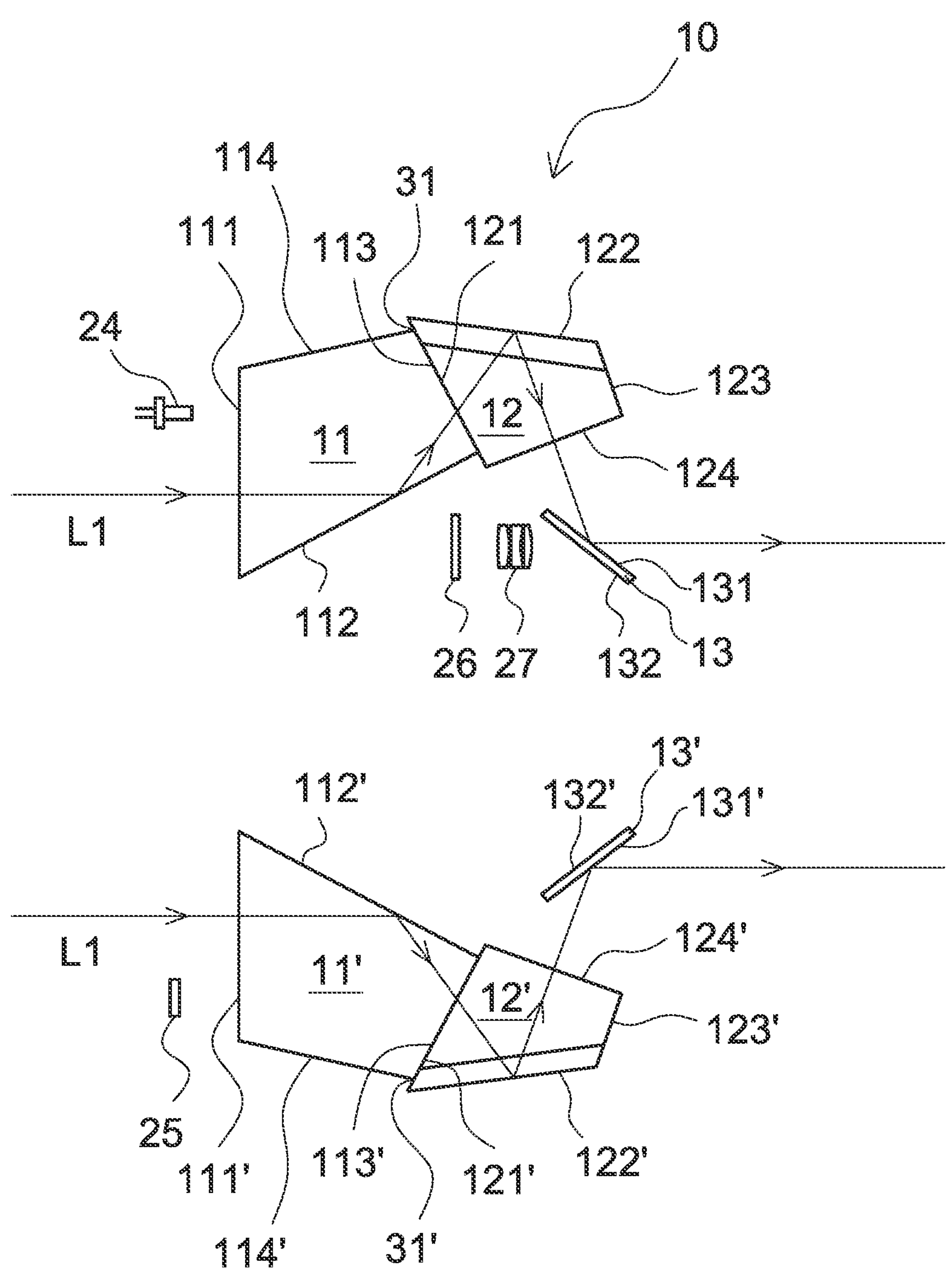
FIG. 1 depicts a prism module and a first visible light path thereof in accordance with an embodiment of the invention.

The prism module of the invention includes at least one first prism, at least one second prism, at least one film and at least one light guide unit. Referring to FIG. 1, the prism module 10 in accordance with an embodiment of the invention includes two first prisms 11, 11', two second prisms 12, 12', two films 31, 31' and two light guide units 13, 13'. The structure of each elements is described below in detail:

The first prism 11 includes a first surface 111, a second surface 112, a third surface 113 and a ninth surface 114. The second prism 12 is disposed at the back side of the first surface 111. The second surface 112 adjoins both of the first surface 111 and the third surface 113. The third surface 113 is disposed towards the second prism 12. The ninth surface 114 adjoins both of the first surface 111 and the third surface 113. Accordingly, the first surface 111 and the third surface 113 are disposed opposite to each other, and the second surface 112 and the ninth surface 114 are disposed opposite to each other.

The second prism 12 includes a fourth surface 121, a fifth surface 122, a tenth surface 123 and a sixth surface 124. The fourth surface 121 is disposed towards the first prism 11. The fifth surface 122 adjoins both of the fourth surface 121 and the tenth surface 123. The first prism 11 is disposed at the back side of the tenth surface 123. The sixth surface 124 adjoins both of the tenth surface 113 and the fourth surface 121. Accordingly, the fourth surface 121 and the tenth surface 123 are disposed opposite to each other, and the fifth surface 122 and the sixth surface 124 are disposed opposite to each other.

The film 31 is disposed between the first prism 11 and the second prism 12. Specifically, the film 31 is disposed between the third surface 113 and the fourth surface 121, wherein the film 31 is formed on the third surface 113 and then the first prism 11 and the second prism 12 are combined. The film 31 allows visible light to pass through but reflects invisible light.

The first prism 11' and the first prism 11 are similar in shape and are placed in a symmetrical arrangement. Therefore, the first prism 11' includes a first surface 111', a second surface 112', a third surface 113' and a ninth surface 114'. The second prism 12' is disposed at the back side of the first surface 111'. The second surface 112' adjoins both of the first surface 111' and the third surface 113'. The third surface 113' is disposed towards the second prism 12'. The ninth surface 114' adjoins both of the first surface 111' and the third surface 113'. Accordingly, the first surface 111' and the third surface 113' are disposed opposite to each other, and the second surface 112' and the ninth surface 114' are disposed opposite to each other.

The second prism 12' and the second prism 12 are similar in shape and are placed in a symmetrical arrangement. Therefore, the second prism 12' includes a fourth surface 121', a fifth surface 122', a tenth surface 123' and a sixth surface 124'. The fourth surface 121' is disposed towards the first prism 11'. The fifth surface 122' adjoins both of the fourth surface 121' and the tenth surface 123'. The first prism 11' is disposed at the back side of the tenth surface 123'. The sixth surface 124' adjoins both of the tenth surface 113' and the fourth surface 121'. Accordingly, the fourth surface 121' and the tenth surface 123' are disposed opposite to each other, and the fifth surface 122' and the sixth surface 124' are disposed opposite to each other.

Similarly, the film 31' is disposed between the first prism 11' and the second prism 12'. Specifically, the film 31' is sandwiched between the third surface 113' and the fourth surface 121'.

The light guide unit 13 is disposed adjacent to the second prism 12 and includes a seventh surface 131 and an eighth surface 132 that are disposed towards opposite directions. Another light guide unit 13' is disposed adjacent to the second prism 12' and includes a seventh surface 131' and an eighth surface 132' that are disposed towards opposite directions. In this embodiment, the light guide units 13, 13' are glass plates and are slanted.

In application, the prism module 10 of the invention can be installed in various optical devices (e.g. telescopes) enabling the user to observe the surrounding environment.

In operation, first visible light L1 (e.g. environmental light) enters the first prisms 11, 11' through the first surfaces 111, 111', is reflected on the second surfaces 112, 112', sequentially passes through the third surfaces 113, 113', the films 31, 31' and the fourth surfaces 121, 121', enters the second prisms 12, 12', is reflected on the fifth surfaces 125, 125', passes through the sixth surfaces 124, 124', exits from the second prisms 12, 12', reaches the light guide units 13, 13', is reflected on the seventh surfaces 131, 131', and reaches user's eyes. It is worth noting that the prism module 10 in some other embodiments may have a single first prism 11 (or 11'), a single second prism 12 (or 12'), a single film 31 (or 31'), and a single light guide unit 13 (or 13') to receive and guide the first visible light L1 for user's observation.

Figure 2:
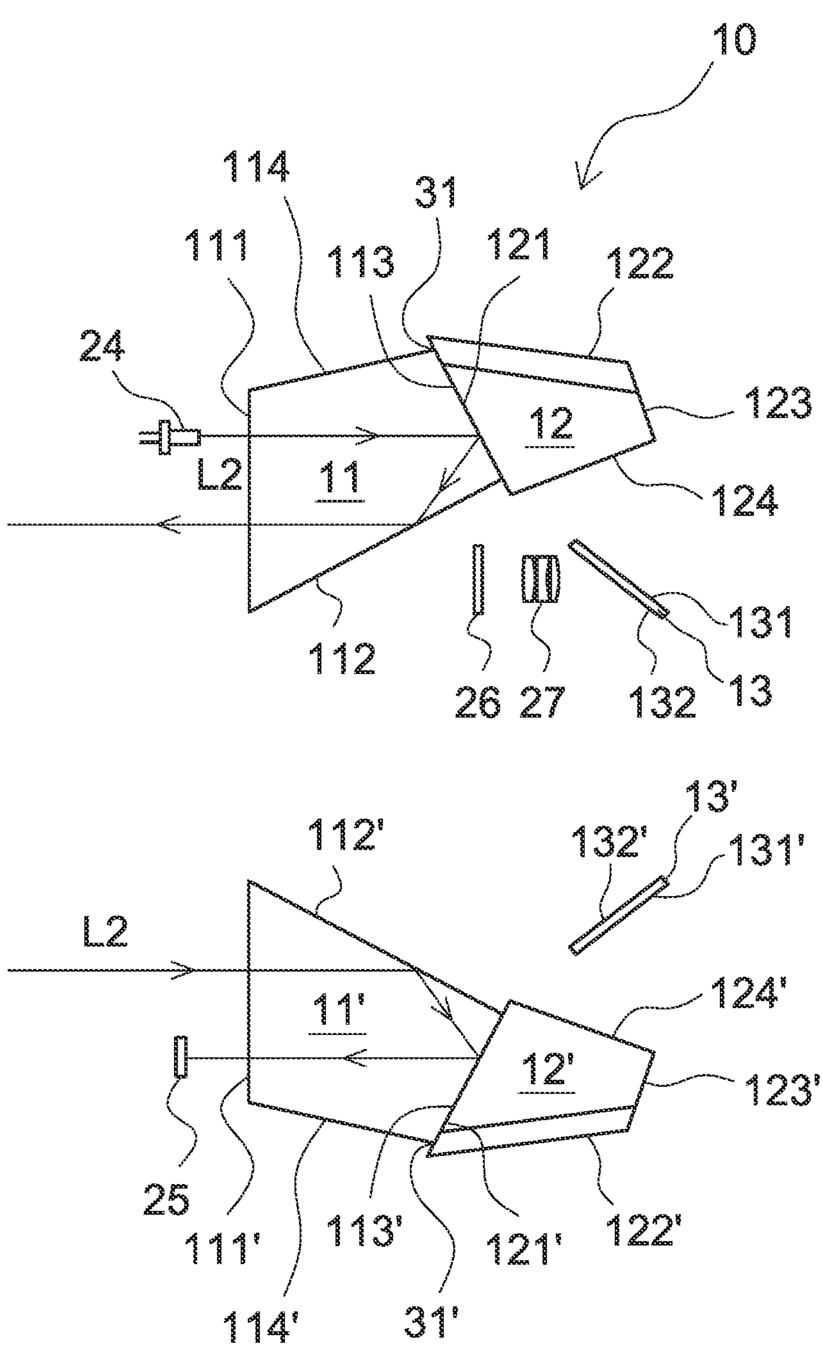
FIG. 2 depicts the prism module of FIG. 2 and an invisible light path thereof.

The prism module 10 of the invention may be used together with a light emitter and a light receiver to measure the distance of a target object when the target object is observed. FIG. 2 depicts a light path of invisible light of the invention. In operation, invisible light L2 (e.g. distance measuring light) is emitted by a light emitter 24, enters the first prism 11 through the first surface 111, is reflected on the third surface 113 to the second surface 112, is reflected on the second surface 112 to the first surface 111, passes through the first surface 111, reaches a target object (not shown), is reflected by the target object, enters another first prism 11' through the first surface 111', is reflected on the second surface 112' to the third surface 113', is reflected on the third surface 113' to the first surface 111', passes through the first surface 111', exits from the first prism 11', and is received by the light receiver 25. Then, the distance of the target object can be obtained by using the formula: Distance=(Light Speed)×(Time Difference)÷2 wherein the time difference is the difference between the time at which the invisible light L2 is received and the time at which the invisible light L2 is emitted. It is worth noting that the travel direction in which the invisible light L2 enters the first prisms 11, 11' and the travel direction in which the invisible light L2 exits from the first prisms 11, 11' are parallel to each other. Further, the films 31, 31' are provided for reflecting almost all the invisible light L2 back to the first prisms 11, 11' when the invisible light L2 reaches the third surface 113, 113'.

The described light emitter 24 may be a laser diode (LD) or other light sources. The described light receiver 25 may be a photoelectric diode (PD), a photomultiplier tube (PMT), a charge coupled device (CCD), an avalanche photodiode (APD), a single-photon avalanche diode (SPAD) or other light detectors.

Figure 3:
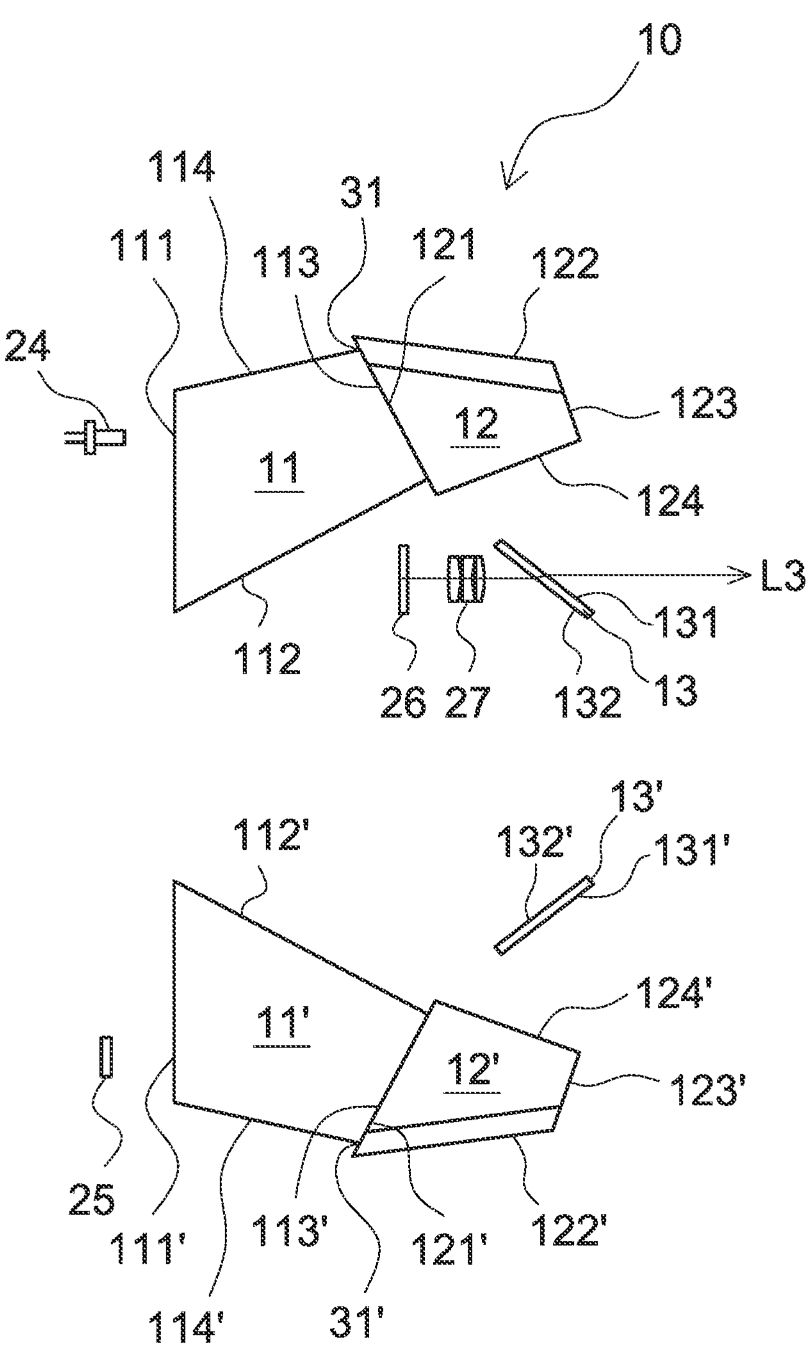
FIG. 3 depicts the prism module of FIG. 2 and a second visible light path thereof.

A display may be used along with the prism module 10 of the invention to provide some important information for user's reference. As shown in FIG. 3, second visible light L3 containing a message of the measured distance is emitted by a display 26, passes through a lens assembly 27 and the light guide unit 13, and reaches user's eye for reference. Specifically, the second visible light L3 sequentially passes through the eighth surface 132 and the seventh surface 131 of the light guide unit 13, and reaches user's eye. It is worth noting that the second visible light L3 exiting from the seventh surface 131 of the light guide unit 13 overlaps the first visible light L1 reflected on the seventh surface 131 of the light guide unit 13 when the surrounding environment is observed.

The described display may be an organic light-emitting diode (OLED), a liquid crystal display (LCD) or other displaying devices.

Figure 4:
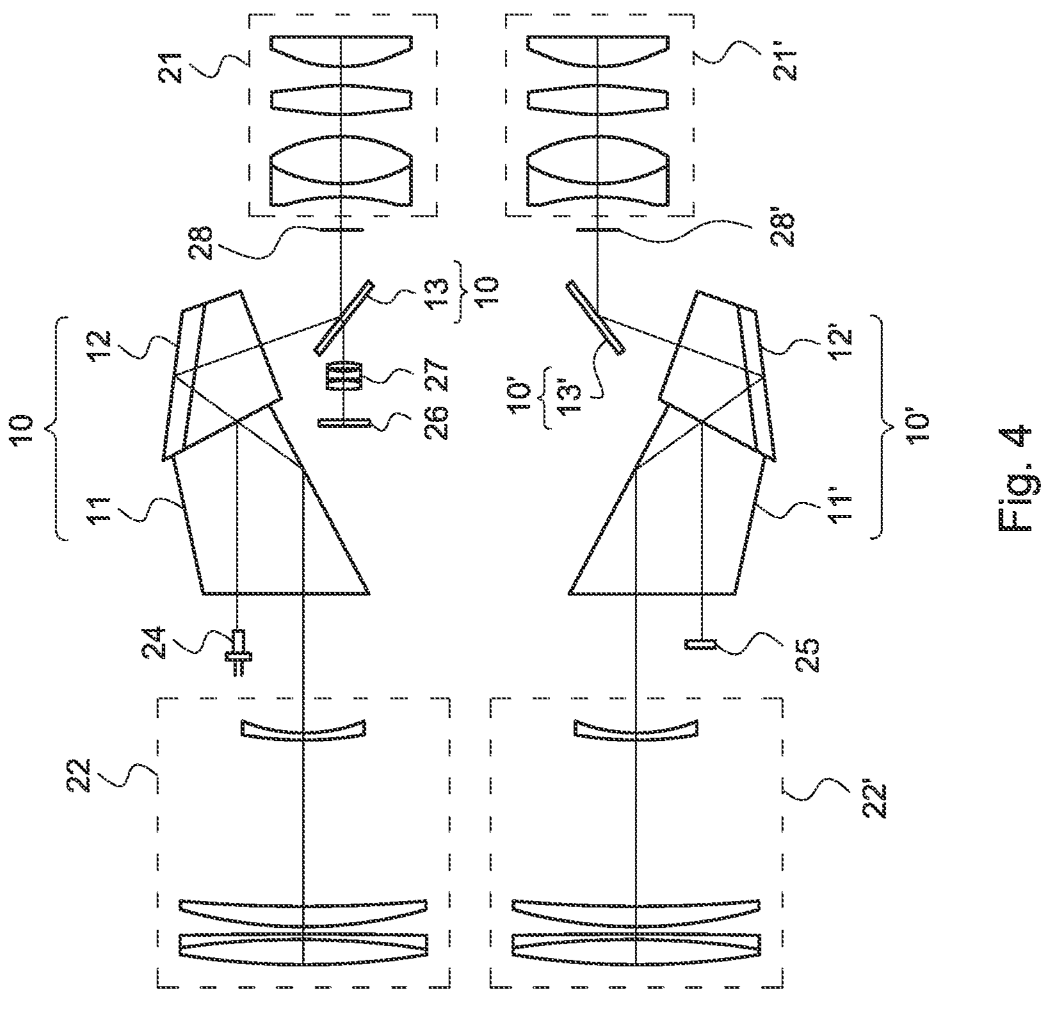
FIG. 4 is a schematic diagram showing the structure of rangefinder binoculars provided with the prism module of the invention that is an application of the prism module of the invention.

An application of the prism module of the invention is shown in FIG. 4. FIG. 4 is a schematic diagram showing the structure of rangefinder binoculars 1 provided with the prism module of the invention, wherein the range finder includes a light emitting part and a light receiving part. The light emitting part includes an object lens unit 22, a light emitter 24, a prism module 10, a display 26, a lens assembly 27, a field stop 28 and an eyepiece unit 21. The light receiving part includes an object lens unit 22', a light receiver 25, a prism module 10', a field stop 28' and an eyepiece unit 21.

When a user observes the surrounding environment with the rangefinder binoculars 1, the first visible light passes through the object lens units 22, 22', the prism modules 10, 10', the field stops 28, 28' and the eyepiece units 21, 21', and reaches user's eyes for an observation. Also, invisible light is emitted by the light emitter 24, passes through the prism module 10 and the object lens unit 22, reaches a target object (not shown), is reflected back to the rangefinder binoculars 1 by the target object, passes through the object lens unit 22' and the prism module 10', and reaches the light receiver 25. The distance of the target object can be obtained by using the time difference. The time difference is a difference between the time at which the invisible light is received and the time at which the invisible light is emitted. Further, second visible light is generated by the display 26, passes through the lens assembly 27, the light guide unit 13, the field stop 28 and the eyepiece unit 21, and reaches user's eye, thereby providing some important messages (e.g. the measured distance and so on) for user's reference.

In conclusion, the prism module of the invention has at least two prisms used along with at least one light guide unit. By means of the prism module, an optical device can be implemented to incorporate a telescope system, a light emitting/receiving system, and a displaying system wherein light from the displaying system is split by the prism module. Further, the optical device has a compact structure. Due to the reduced volume of the optical device, the light path of the displaying system is shortened and the brightness of the displaying system is promoted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A prism module, comprising:

a first prism comprising a first surface, a second surface and a third surface wherein the second surface adjoins the first surface, and the third surface adjoins the second surface and is disposed opposite to the first surface;

a second prism comprising a fourth surface, a fifth surface and a sixth surface wherein the fourth surface is disposed towards the first prism, the sixth surface adjoins the fourth surface, and the fifth surface adjoins the fourth surface and is disposed opposite to the sixth surface;

a film disposed between the third surface and the fourth surface;

a light guide unit comprising a seventh surface and an eighth surface;

wherein first visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit;

wherein second visible light enters the light guide unit through the eighth surface and exits from the light guide unit through the seventh surface.

2. The prism module as claimed in claim 1, wherein invisible light enters the first prism through the first surface, is reflected on the third surface and then on the second surface, and exits from the first prism through the first surface, and a travel direction in which the invisible light enters the first prism and that in which the invisible light exits from the first prism are in parallel.

3. The prism module as claimed in claim 2, wherein the film allows the first visible light to pass through but reflects the invisible light.

4. The prism module as claimed in claim 1, wherein invisible light is reflected to the prism module by a target object, enters the first prism through the first surface, is reflected on the second surface and then on the third surface, and exits from the first prism through the first surface.

5. The prism module as claimed in claim 4, wherein the film allows the first visible light to pass through but reflects the invisible light.

6. An optical device, comprising:

the prism module as claimed in claim 1;

a display generating the second visible light wherein the first visible light reflected on the seventh surface of the light guide unit overlaps the second visible light exiting from the seventh surface of the light guide unit.

7. A prism module, comprising:

a first prism comprising a first surface, a second surface and a third surface wherein the second surface adjoins the first surface, and the third surface adjoins the second surface and is disposed opposite to the first surface;

a second prism comprising a fourth surface, wherein the fourth surface is disposed towards the third surface of the first prism;

a film disposed between the third surface and the fourth surface;

wherein invisible light enters the first prism through the first surface, is reflected on the third surface and then on the second surface, and exits from the first prism through the first surface;

wherein the invisible light is reflected back to the first prism by the film.

8. An optical device, comprising:

the prism module as claimed in claim 7;

a light emitter generating the invisible light that enters the first prism;

a light receiver receiving the invisible light that exits from the first prism through the first surface and is reflected back to the optical device by a target object.

9. The optical device as claimed in claim 8, wherein a travel direction in which the invisible light enters the first prism and another travel direction in which the invisible light exits from the first prism are in parallel.

10. The optical device as claimed in claim 9, wherein:

the second prism further comprises a fifth surface and a sixth surface;

the prism module further comprises a light guide unit;

the light guide unit comprises a seventh surface;

first visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit.

11. The optical device as claimed in claim 10, wherein the film allows the first visible light to pass through but reflects the invisible light.

12. An optical device, comprising:

the prism module as claimed in claim 10;

a light emitter generating the invisible light that travels to the target object;

a light receiver receiving the invisible light that exits from the first prism through the first surface.

13. The optical device as claimed in claim 12, wherein a travel direction in which the invisible light travels to the first prism and another travel direction in which the invisible light exits from the first prism are in parallel.

14. The optical device as claimed in claim 9, wherein:

the second prism further comprises a fifth surface and a sixth surface;

the prism module further comprises a light guide unit;

the light guide unit comprises a seventh surface and an eighth surface;

second visible light enters the light guide unit through the eighth surface and exits from the light guide unit through the seventh surface.

15. The optical device as claimed in claim 14, wherein a display generating the second visible light.

16. A prism module, comprising:

a first prism comprising a first surface, a second surface and a third surface wherein the second surface adjoins the first surface, and the third surface adjoins the second surface and is disposed opposite to the first surface;

a second prism comprising a fourth surface, wherein the fourth surface is disposed towards the third surface of the first prism;

a film disposed between the third surface and the fourth surface;

wherein invisible light is reflected to the prism module by a target object, enters the first prism through the first surface, is reflected on the second surface and then on the third surface, and exits from the first prism through the first surface;

wherein the invisible light is reflected back to the first prism by the film.

17. The prism module as claimed in claim 16, wherein:

the second prism further comprises a fifth surface and a sixth surface;

the prism module further comprises a light guide unit;

the light guide unit comprises a seventh surface;

first visible light enters the first prism through the first surface, is reflected on the second surface, sequentially passes through the third surface and the film, enters the second prism through the fourth surface, is reflected on the fifth surface, passes through the sixth surface, exits from the second prism, reaches the light guide unit, and is reflected on the seventh surface of the light guide unit.

18. The prism module as claimed in claim 17, wherein the film allows the first visible light to pass through but reflects the invisible light.

19. The prism module as claimed in claim 16, wherein:

the second prism further comprises a fifth surface and a sixth surface;

the prism module further comprises a light guide unit;

the light guide unit comprises a seventh surface and an eighth surface;

second visible light enters the light guide unit through the eighth surface and exits from the light guide unit through the seventh surface.

20. The prism module as claimed in claim 19, wherein a display generating the second visible light.

* * * * *